Feb. 20, 1951     H. GUENTHER     2,542,409
DEVICE FOR CLAMPING AN AUXILIARY
SHIELD TO A GLARE SHIELD
Filed Feb. 7, 1947

Hermann Guenther
INVENTOR

BY *CA Snow & Co.*

ATTORNEYS.

Patented Feb. 20, 1951

2,542,409

UNITED STATES PATENT OFFICE 2,542,409

DEVICE FOR CLAMPING AN AUXILIARY SHIELD TO A GLARE SHIELD

Hermann Guenther, Mendenhall, Pa.

Application February 7, 1947, Serial No. 727,095

1 Claim. (Cl. 296—97)

This invention relates to a glare shield and light filter designed primarily for use with automobiles, streetcars, locomotives, airplanes, or the like, the object of the invention being to provide a device which may be readily and easily attached to the usual sun shields of vehicles, to insure against blinding the operator by the light rays of approaching motor vehicles, or the sun rays, when driving into the sun.

Another object of the invention is to provide a device of this character which is constructed of transparent plastic material and colored in such a way that the light rays passing therethrough will be filtered on its passage through the glare shield.

Another object of the invention is to provide a support for the glare shield or light filter which will permit the glare shield or light filter to be rotated so that the glare shield may be adjusted with respect to the line of vision of the person operating the vehicle, so that a dense portion of the shield may be brought before the line of vision of the operator, in the case of an intense light being projected therethrough, or a more transparent portion brought before the eyes of the operator, when the light rays projected towards the shield, are not so intense.

Still another object of the invention is to provide means for supporting the glare shield in such a way that the supporting means may be readily and easily clamped in position on the usual sun shield.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
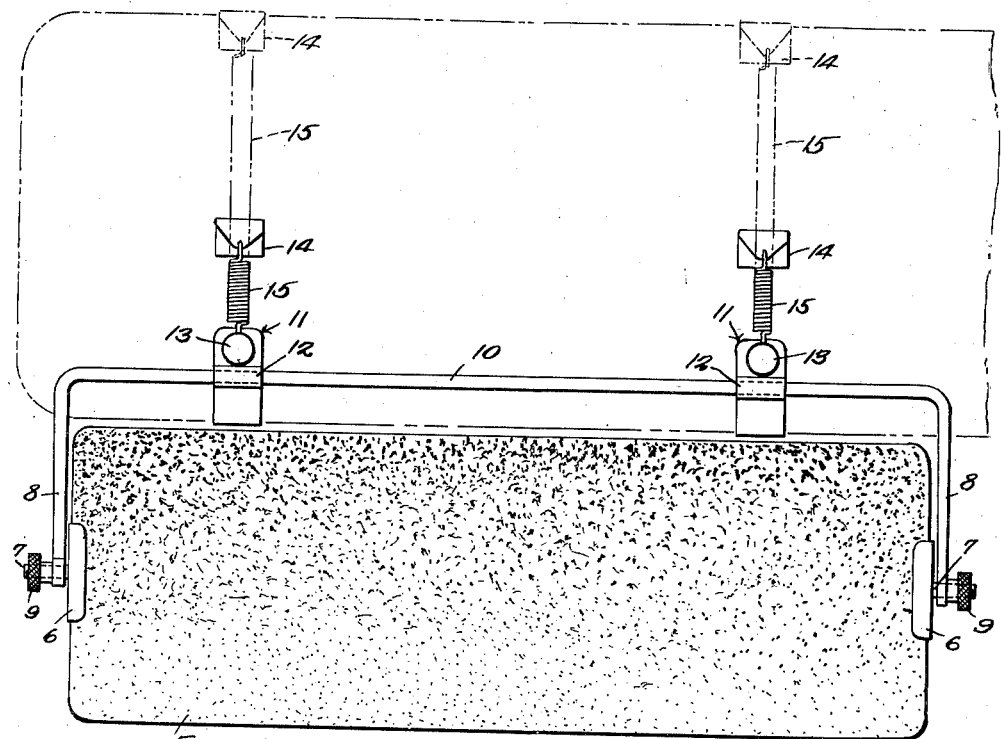
Figure 1 is an elevational view illustrating a glare shield and light filter, constructed in accordance with the invention, as removably secured to a sun shield of a motor vehicle.
Figure 2:
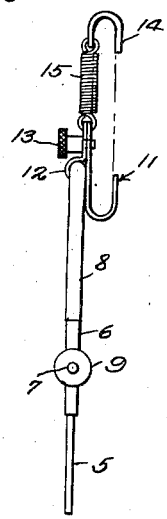
Figure 2 is an end elevational view.
Figure 3:
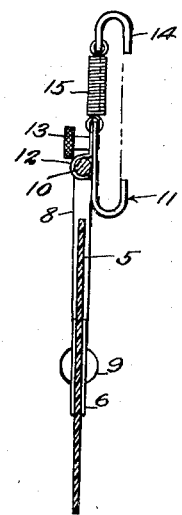
Figure 3 is a vertical sectional view through the glare shield and light filter.

Referring to the drawing in detail, the shield proper which is indicated by the reference character 5, is constructed of a length of plastic material, of a transparent character, the shield being coated with material to increase the density of the transparency along one edge of the shield proper, the density gradually fading out towards the opposite edge of the shield proper.

Clamps indicated by the reference character 6 clamp the ends of the shield proper, and these clamps are formed with pins 7 that extend through openings in the ends of the arms 8, the ends of the pins being formed with removable caps 9 to secure the clamps to the arms 8.

The arms 8 are formed by bending the ends of the main bar 10 of the support, at right angles, as clearly shown by Figure 1 of the drawing.

This bar 10 provides means to which the clamp sections 11 are secured, the clamp sections 11 including removable sections 12 which are secured to the main portions of the clamp sections 11, by means of the screws 13 which extend into threaded openings formed in the clamp section 11, the enlarged portions of the screws 13 engaging the sections 12, drawing the sections 11 and 12 together.

Cooperating with the clamp sections 11, are hooks 14, which hook over the upper edge of a suitable support, such as a motor vehicle sun shield, thereby to secure the device in position. The hooks 14 are connected to the clamp sections 11, by the coiled springs 15 which when stretched, to position the hooks, exert a pull on the clamp sections 11 and hooks 14, to cause them to grip the edges of the sun shield to which the device is secured.

From the foregoing, it will be seen that due to the construction shown and described, I have provided an auxiliary sun shield which is coated with suitable material to vary the degree of density of transparency of the shield to the end that when strong light rays are directed towards the operator of the vehicle equipped with the sun shield, the sun shield may be turned to shield the eyes of the operator, against the intense light rays.

Under normal driving conditions, it may be desirable to so turn the sun shield that a portion of the shield having less density will be brought within the line of vision of the operator.

What is claimed is:

A glare shield comprising a body portion, a supporting bar having right angled ends between which the body portion is mounted, pairs of clamps for clamping over the opposite edges of a sun-shade of a motor vehicle, a coiled spring connecting the clamps of each pair of clamps, drawing the clamps into gripping relation with the sun-shade, a removable bar-engaging clamp mounted on one of the clamps of each pair of clamps, the removable bar-engaging clamp gripping the supporting bar, and set screws removably securing the bar-engaging clamps on one clamp of each pair of clamps.

HERMANN GUENTHER.

REFERENCES CITED

The following references are of record in the file of this patent:

UNITED STATES PATENTS

| Number | Name | Date |
| --- | --- | --- |
| 1,461,289 | Primrose | July 10, 1923 |
| 2,096,142 | Stover | Oct. 19, 1937 |
| 2,212,007 | Buchanan | Aug. 20, 1940 |
| 2,239,158 | McCloud | Apr. 22, 1941 |